(12) United States Patent  
Hempy et al.

(10) Patent No.: US 8,447,006 B2
(45) Date of Patent: May 21, 2013

(54) SHIPPING PACKAGE UP-ENDER

(75) Inventors: Brian E. Hempy, Columbia, SC (US); Richard F. Rochow, Forest, VA (US); Matt W. Ales, Forest, VA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1156 days.

(21) Appl. No.: 11/379,082

(22) Filed: Apr. 18, 2006

(65) Prior Publication Data
US 2007/0241001 A1 Oct. 18, 2007

(51) Int. Cl.
*B65G 65/23* (2006.01)
*G21C 19/00* (2006.01)
*B65G 65/00* (2006.01)

(52) U.S. Cl.
USPC ........... 376/272; 376/260; 376/463; 414/403; 414/419; 414/420; 414/425; 414/754; 414/758; 414/768; 414/773

(58) Field of Classification Search
USPC ................... 414/768, 770, 776, 22.54, 22.55, 414/24, 745.8, 754, 758, 745.1, 745.7, 22.51, 414/22.52, 403, 419, 420, 425; 254/124, 254/120; 376/272, 260, 463
See application file for complete search history.

(56) References Cited

U.S. PATENT DOCUMENTS

| | | | | |
|---|---|---|---|---|
| 4,644,429 A | * | 2/1987 | Boe | 360/255.2 |
| 5,011,364 A | * | 4/1991 | Anderson | 414/694 |
| 6,266,386 B1 | | 7/2001 | Patel et al. | |
| 6,273,667 B2 | * | 8/2001 | Karpisek | 414/425 |
| 6,683,931 B1 | | 1/2004 | Stilwell, III et al. | |
| 6,748,042 B1 | | 6/2004 | Stilwell, III et al. | |

* cited by examiner

*Primary Examiner* — Bernarr Gregory

(57) ABSTRACT

A reusable up-ending device for loading or unloading nuclear fuel assembly shipping packages. The device has a translating base mounted to a fixed beam structure and two stabilizing arms affixed to a mounting fixture on the base that is secured to the operating floor. The stabilizing arms include a spring dampener and have a simple elbow joint that straightens after the package is up righted. Translation is achieved by means of a hand adjustable lead screw and enables the base to be most advantageously positioned. The shipping package is inserted into pivot mount blocks located at the front of the base and the package is secured at the pivot mount blocks by means of a trunnion and at the support arms by means of a locking pin. Once the package is up-righted the elbows on the support arms are locked in place.

12 Claims, 6 Drawing Sheets

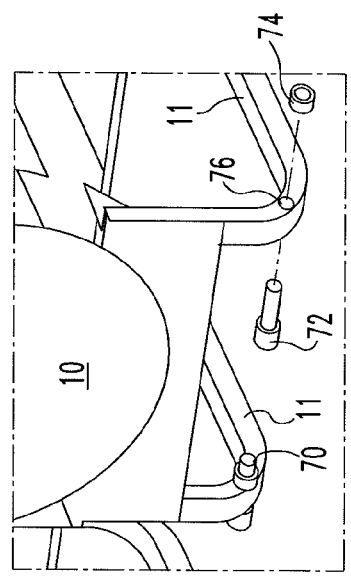
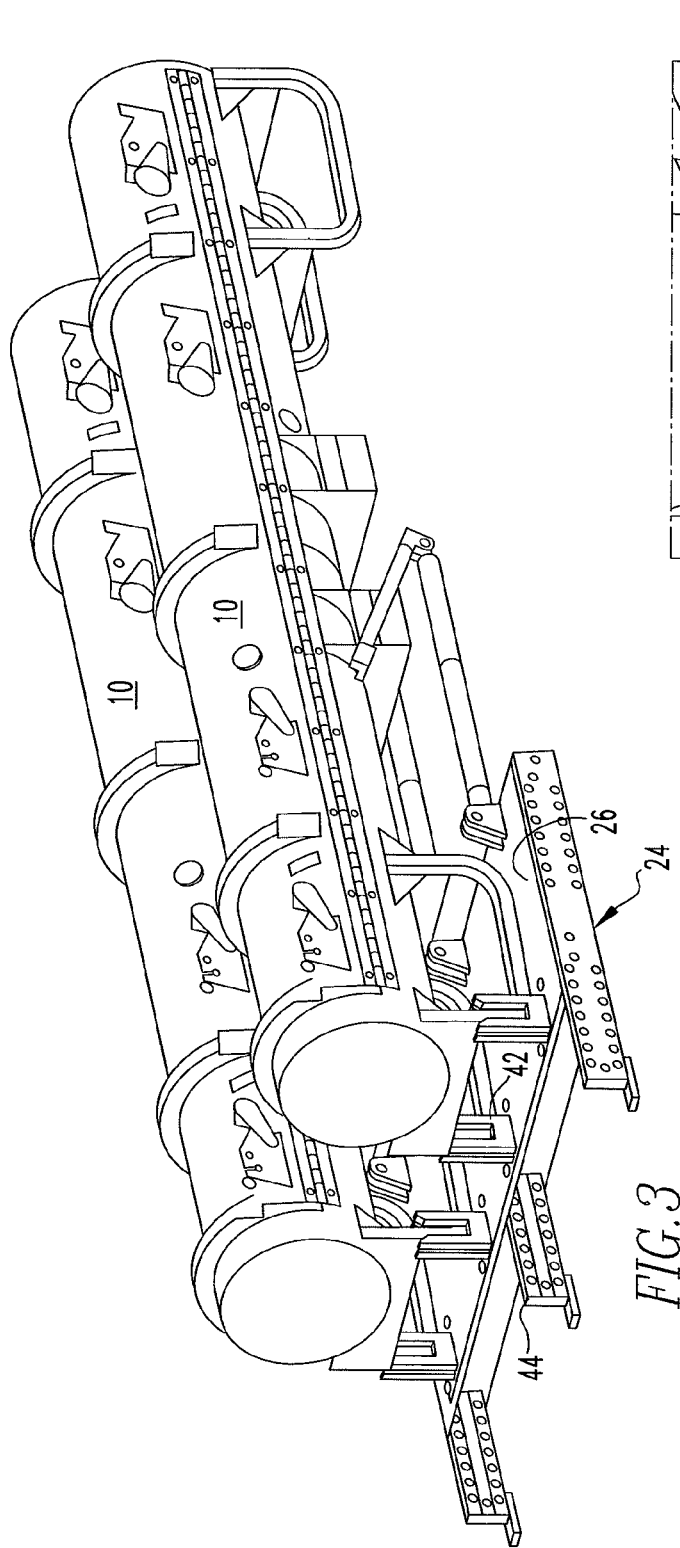
FIG.3
FIG.4

SHIPPING PACKAGE UP-ENDER

BACKGROUND OF THE INVENTION

1. Field of the Invention

This invention pertains generally to handling equipment for a shipping container for nuclear fuel components and, in particular, to an up-ender device to facilitate translation of such a shipping container between a horizontal and vertical orientation.

2. Related Art

In the shipping and storage of unirradiated nuclear fuel elements and assemblies, which contain large quantities of and/or enrichments of fissile material, $U^{235}$, it is necessary to assure that criticality is avoided during normal use, as well as under potential accident conditions. For example, fuel shipping containers are licensed by the Nuclear Regulatory Commission (NRC) to ship specific maximum fuel enrichments (i.e., weight and weight-% $U^{235}$) for each fuel assembly design. In order for a new shipping container design to receive licensing approval, it must be demonstrated to the satisfaction of the NRC that the new container design will meet the requirements of the NRC rules and regulations, including those defined in 10 CFR Section 71. These requirements define the maximum credible accident that the shipping container and its internal support structures must endure in order to maintain the subcriticality of the fuel assembly housed therein.

A new unirradiated fuel shipping package, designated the TRAVELLER™, shipping package, has been designed and recently licensed. The TRAVELLER™ shipping package represents the latest technology in unirradiated fuel transport as evidence by being the first package to be licensed with an actual fire test. The newly designed packages carry a single fuel assembly and require unique handling.

The TRAVELLER™ shipping packages are reusable shipping packages designed for the safe transport of a single unirradiated fuel assembly with or without core components. The package also provides shock and vibration isolation and protects the fuel assembly from damage during normal handling and shipping. The package consists of an aluminum square inner clamshell which is attached to an outer-pack by means of rubber shock mounts. The outerpack consists of outer and inner stainless steel shells encasing closed cell polyurethane foam for impact and thermal protection. The clamshell is an aluminum structure comprised of a "V" base, two hinged doors, a bottom and top plate and a hinged top accessed door. The doors are latched by means of quarter turn fasteners. Spring loaded plungers on both sides of the nuts positively restrain each nut during shipping and handling, and precludes any invertant opening of the latch. A more complete understanding of the design of the TRAVELLER™ shipping package can be obtained from U.S. Pat. No. 6,748,042, issued Jun. 8, 2004.

In the horizontal position in which the TRAVELLER™ shipping package is transported, the package has a nominal width of 27.1 inches (68.83 cm) and a nominal height of 39.3 inches (99.82 cm). The length of the shipping package will vary depending upon the length of the fuel assembly being shipped but typically is between 197 (500.38 cm) and 226 inches (574.04 cm). The TRAVELLER™ shipping package 10 outerpack 12 handling features are shown in FIG. 1. Brackets 14 to accept a forklift are located on the bottom of the outerpack 12. In addition, lifting eyes 16 are provided on the top outerpack 12 of each shipping package. There are eight lifting eyes total, two at each end of the outerpack top. Fuel assemblies are loaded and unloaded into and out of the TRAVELLER™ shipping package with the package uprighted in a vertical position. To upright the package 10, two hoist rings 18 are bolted to the forward end 22 of the TRAVELLER™ shipping package 10.

Special tooling is desired to upright the package for fuel assembly loading and unloading operations to avoid damaging the package and its contents so that the TRAVELLER™ shipping package can be reused indefinitely.

SUMMARY OF THE INVENTION

Accordingly it is an object of this invention to provide a reusable up-ending device that can consistently up-end the TRAVELLER™ shipping package without damage to the package or its contents.

It is further object of this invention to provide such an up-ending device that can position the TRAVELLER™ shipping package in the upright orientation to facilitate loading and unloading of the fuel assemblies.

It is additional object of this invention to provide such an up-ending device that will reduce center of gravity-over corners "snaps" typical of up-ending structures.

These and other objects are achieved by an up-ending device of this invention which is used to facilitate the loading and unloading of nuclear fuel assemblies and core components into and out of the TRAVELLER™ shipping package. The device of this invention is a structural component having a translating base mounted to a fixed beam structure that is secured to the floor of the facility where the loading or unloading operation is to take place. Two stabilizing arms are provided for each package that is to be simultaneously up-ended and at least one of the arms per package includes a spring dampener to reduce center of gravity-over corners "snaps" typical of up-ending structures. One or both stabilizing arms per package are designed with a simple elbow joint that straightens after the package is up righted. Translation is achieved by means of a hand adjustable lead screw that translates the base of the up-ender in the horizontal direction. Translation of the base enables the operator to position the TRAVELLER™ shipping package as close to the desired area of operation as possible for ergonomically correct package unpacking. The front legs of the TRAVELLER™ shipping package are inserted into pivot mount yokes located at the front of the base of the up-ender and the TRAVELLER™ shipping package is secured in the yokes by means of trunnions. The stabilizing support arms are secured to the sides of the package, at a spaced location from the position where the yokes are secured, with a lock pin. Once the package is up righted, the stabilizer bars are pinned in place to lock the arms in a fully extended position to facilitate package loading or unloading.

BRIEF DESCRIPTION OF THE DRAWINGS

A further understanding of the invention can be gained from the following description of the preferred embodiments when read in conjunction with the accompanying drawings in which:

FIG. 3 is a perspective view of two TRAVELLER™ shipping packages supported side by side on the up-ending device of this invention;

FIG. 4 is a planned view of the front end leg portion showing the trunnion connection between the TRAVEL- LER™ shipping package and the front yokes on the up-ending device of this invention;

DESCRIPTION OF THE PREFERRED EMBODIMENTS

Figure 1:
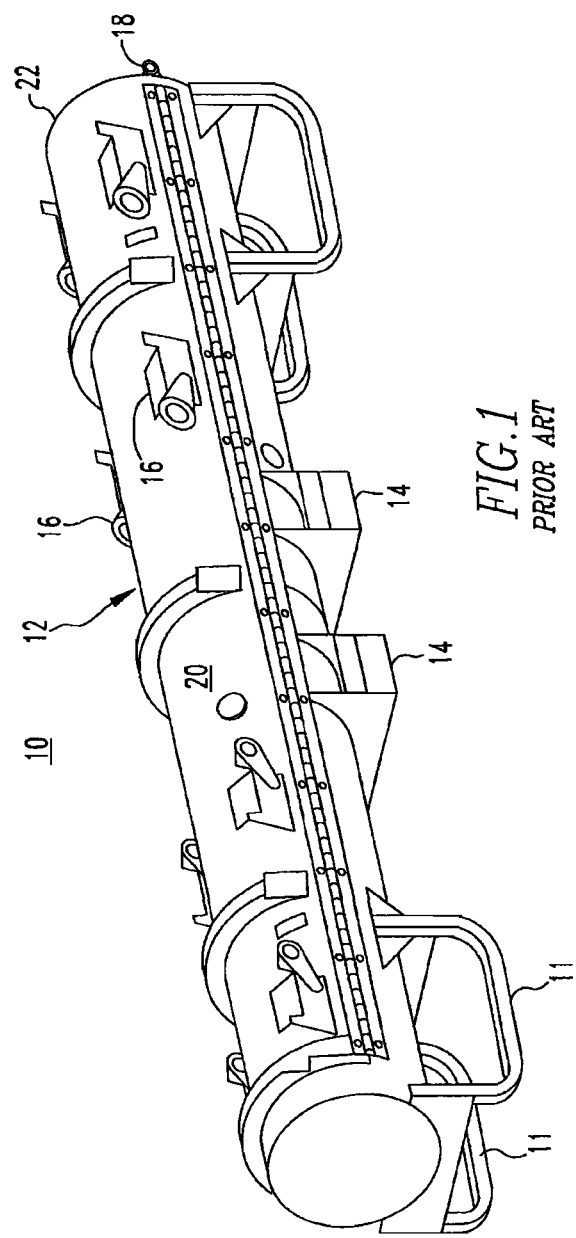
FIG. 1 is a perspective view of the TRAVELLER™ shipping package.
Figure 2:
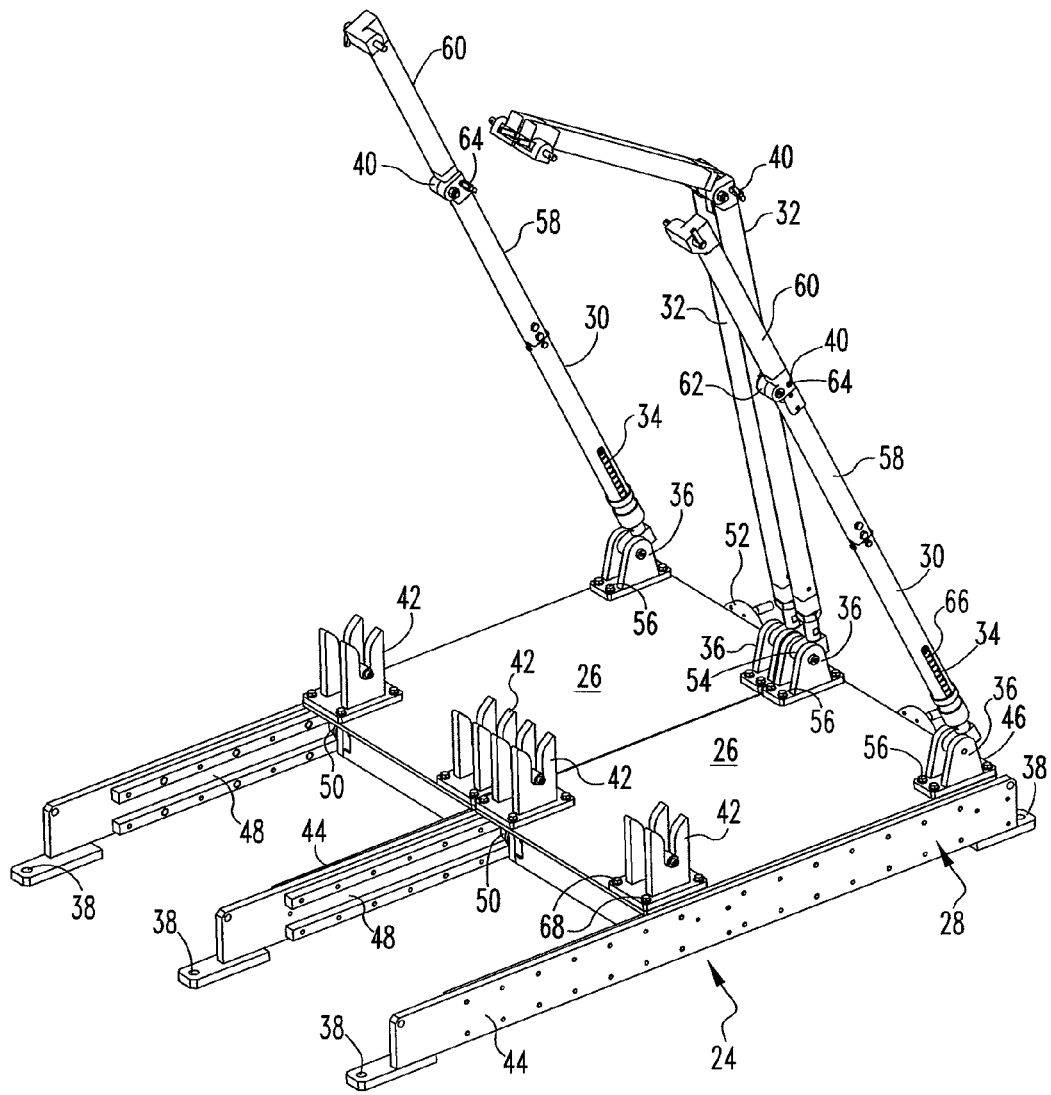
FIG. 2 is a planned view of the up-ending device of this invention.

Without further support, such as is provided by a shipping cask, nuclear fuel assemblies need to be moved in the vertical orientation so that the fuel rods and guide thimbles do not bow. However, single fuel assembly shipping packages, such as the TRAVELLER™ shipping package 10 shown in FIG. 1, due to the elongated dimension of the outerpack 12 are more stable if shipped in a horizontal orientation. Therefore, shipping packages, such as the TRAVELLER™ shipping package 10, need to be up-ended to a vertical orientation to be loaded and unloaded. A reusable up-ending device 24, constructed in accordance with this invention, is used to facilitate the loading and unloading of nuclear fuel packages. The up-ending device 24 shown in FIG. 2 is a structural component having a translating base 26 mounted to a fixed beam structure 28. The translating base 26 has at least two stabilizing or support arms 30 and 32 that are bolted to a mounting fixture 36 located at the back of the translating base 26 affixed approximate the corners of the base. The base 26 is mounted to the floor at the loading and unloading locations by means of bolts 38. At least one of the stabilizing arms 30 includes a spring dampener 34 to reduce center of gravity-over corners "snaps" typical of up-ending structures. Both stabilizing arms are designed with a simple elbow joint 40 that straightens as the shipping package 10 is up righted. The purpose of the translating base is to permit operators of plants employing different types of fuel to bring the shipping package close enough to the loading and unloading platform for ergonomically correct package unpacking.

To up right the shipping package legs on the shipping package are inserted into pivot mount blocks 42 located at the front of the translating base 26 proximate its corners. The front of the shipping package 10 has legs below where the lower nozzle of the fuel assembly is seated, that supports the front of the package when the package is oriented in a horizontal position. The forward portion of the legs 11 are secured within the mounting blocks or yokes 42 by means of a trunnion or locking pin as will be explained hereafter. Once the package is uprighted, the stabilizing or support arms are pinned in place at the elbow joint to facilitate package loading or unloading.

More particularly the fixed beam structure 28 is made up of two parallel rectangular side beams 44 that are connected in the rear by an orthogonally oriented rectangular rear beam 46. The side beams 44 contain a track or rail 48 on the side beams' opposing surfaces that run substantially the length of the elongated dimension of the side beam. Wheels 50 on the underside of the translating base 26 ride on the track 48. A hand wheel 52 turns a worm gear or lead screw and affects motion to the translating base 26 to drive the wheels 50 to either the front or the back of the up-ending device 24. It should be appreciated that the translation mechanism for translating the base 26 is an optional feature of this invention that enables easier positioning of the device once it is secured to the operating floor. The base 26 could, alternatively, be affixed directly to the operating floor.

A circular bracket 54 is affixed to the base of each support arm and has a central hole that's captured by a pin that extends between and is affixed to two spaced parallel plates that extend up as part of the support arm mounting fixture 36. The mounting fixture 36 is fixed to the upper surface of the base 26 by four mounting screws 56. The support arm mounting fixture 36 thus enables the support arm to rotate in a plane parallel to the side beams 44. Preferably one or both of the support arms 30 and 32 includes a simple elbow 40 formed by a pin joint connecting adjacent ligaments 58 and 60. The elbow 40 has mating apertures 62 that are respectfully affixed to the ligaments 58 and 60 and aligned when the support arms 30 and 32 are fully extended. When the support arms 30 and 32 are fully extended a locking pin 64 can be inserted into the apertures 62 to lock the support arm 30, 32 in its fully extended position. The spring dampener 34 comprises a spring 66 which extends within the tubular support arm 30, anchored at one end at a lower portion of the support arm and at the other end attached to the ligament 60. The locking arrangement 62, 64 and the damper 34 can be provided in one or both of the support arms 30, 32. A yoke or pivot mount block 42 is positioned approximate each front corner of the base 26 affixed to the upper surface by mounting bolts 68. The yokes or pivot blocks 42 are formed from two parallel plates perpendicularly extending from the base 26, each having a slot sized to seat a trunnion 70 which is attached to a lower leg of the shipping package as will be more fully explained hereafter.

Operation of the Up-Ending Device

Figure 5:
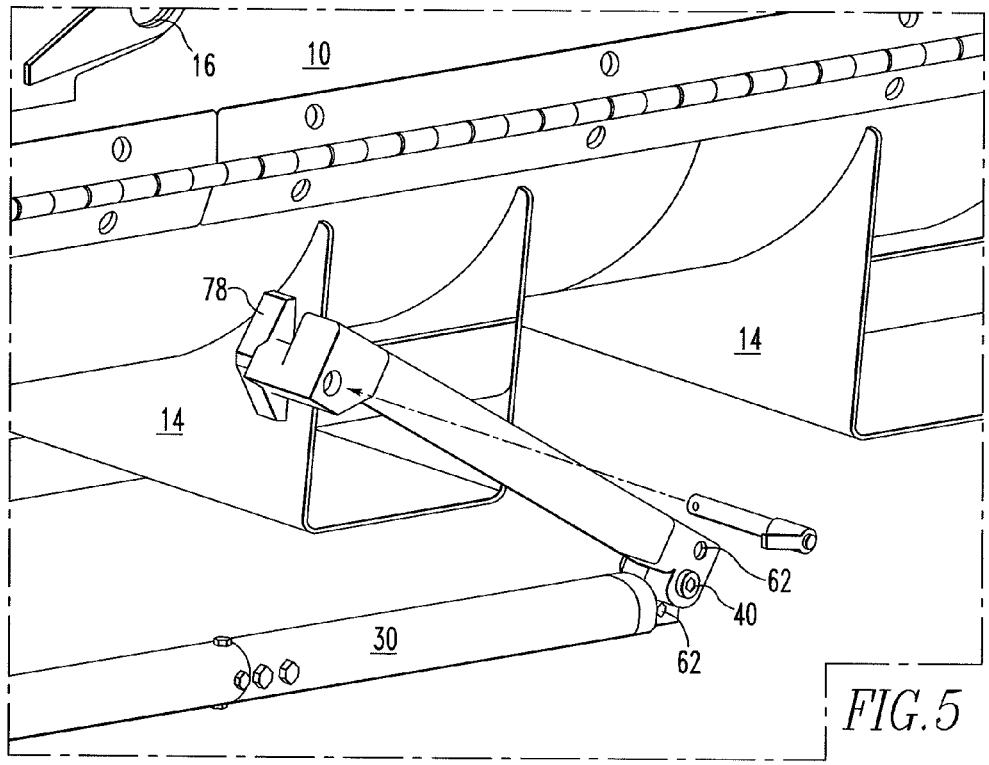
FIG. 5 is a planned view of an enlarge section of the lower forklift brackets on the TRAVELLER™ shipping package illustrating the connection between the TRAVELLER™ shipping package and the support arms of the up-ending device of this invention.
Figure 6:
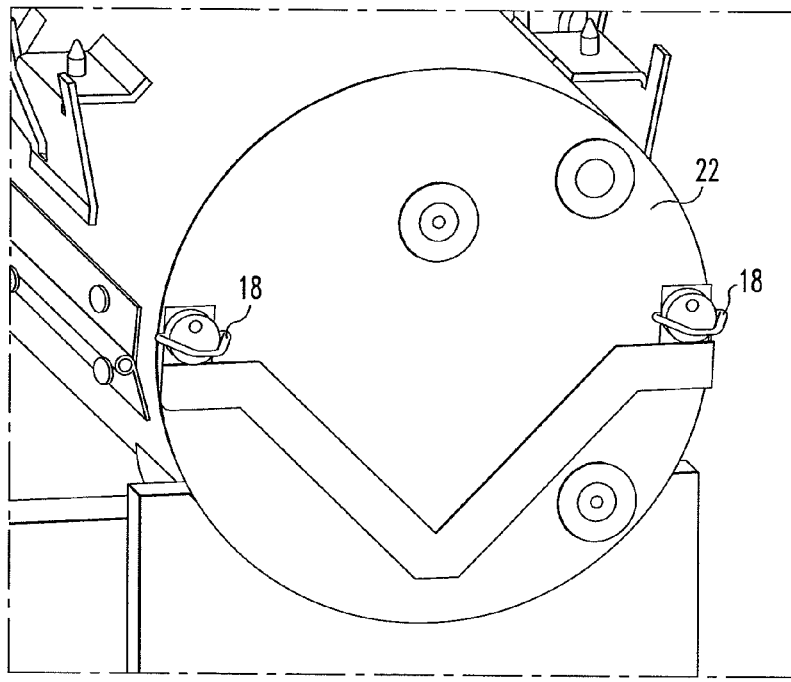
FIG. 6 is an end view of the TRAVELLER™ shipping package illustrating the positioning of the hoist rings.

When the shipping package is in the horizontal position it should be maintained level on the floor of the fuel handling area. FIG. 3 shows two shipping packages positioned side by side on two up-ender devices that share a common side beam 44. In all other respects the up-ending devices shown at FIG. 3 are identical to that previously described above. Where the up-ending device 24 is elevated to accommodate translation, such as shown in FIG. 3, a leveling support stand should be placed aft of the up-ender so that it will support the legs of the shipping package at the top nozzle end 22 of the shipping package (the leveling support stand is not shown in FIG. 3), so that the shipping package remains horizontal on a level plane. Referring to FIG. 4 trunnions are installed into holes provided through the shipping package legs 11 at the bottom nozzle end of the shipping package by inserting the male half of the trunnion 72 through the supplied hole 76 in the shipping package leg 11. The threaded female trunnion half 74 is then attached to the male half and rotated until tight. The shipping package 10 is installed on the up-ender so that the trunnions are seated within the notch in the pivot mount blocks or yokes 42 and the support arms 30 and 32 are connected to either side of the shipping package using quick release pins. The quick release pins are connected to mounting blocks 78 on the support arms 30, 32, adjacent to the fork lift pockets 14 as can be appreciated from FIG. 5. FIG. 6 more clearly shows the hoist rings 18 that are supported at the top end of the shipping package 22 on the upper half 20 of the overpack 12. The hoist rings 18 are attached to a crane sling which is used to lift the aft end of the shipping package 10.

Figure 7:
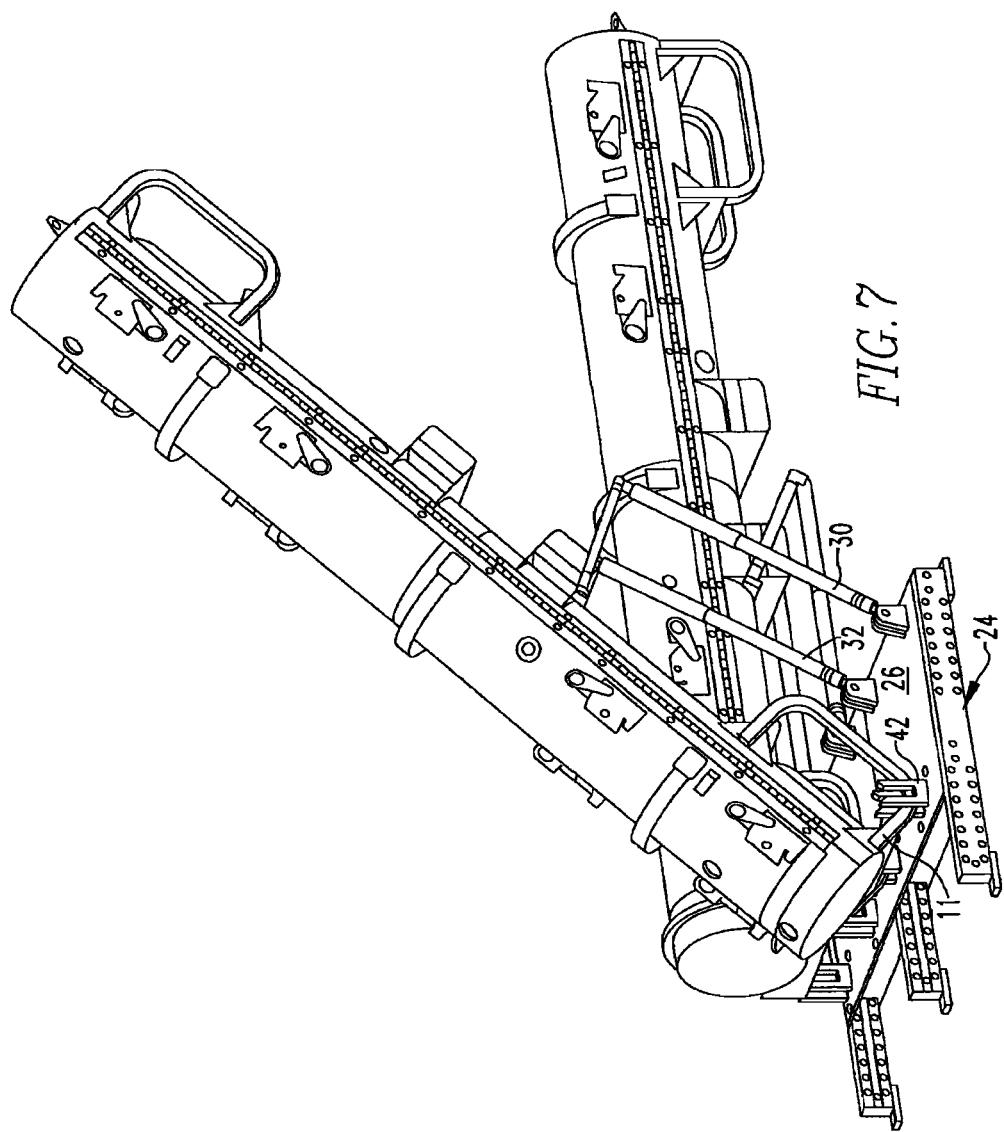
FIG. 7 is a perspective view of the TRAVELLER™ shipping package being raised by the up-ending device of this invention.
Figure 8:
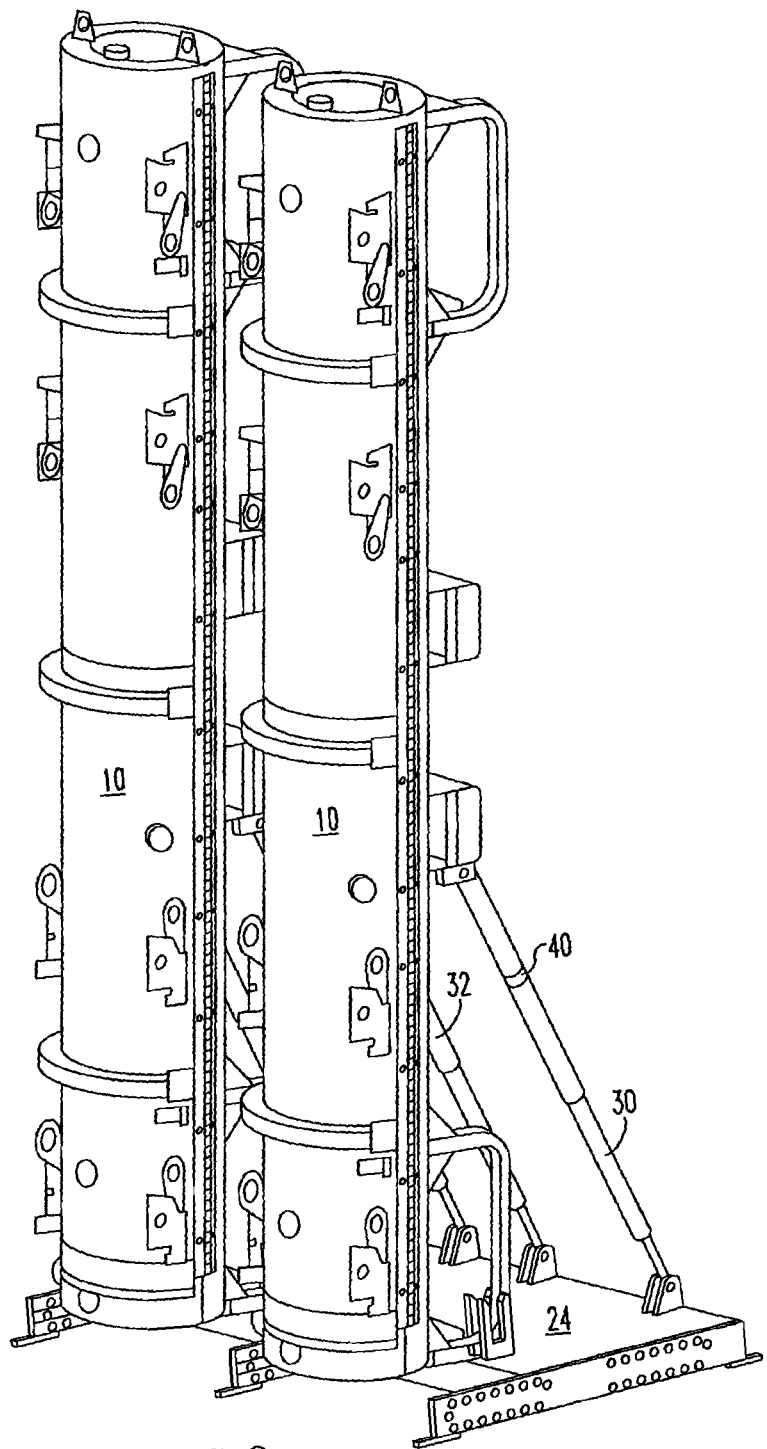
FIG. 8 is a perspective view of the TRAVELLER™ shipping package raised to a near vertical position with the support arms of the up-ending device of this invention fully extended in the locked position.

As can be appreciated from FIG. 7, the support arms 30 and 32 extend as the hoist lifts the aft end 22 of the shipping package 10 by the hoist rings 18. The shipping package is slowly raised at the top nozzle end to a near vertical orientation. Crane movement has to be coordinated in the vertical and horizontal directions in steps small enough to maintain near vertical alignment of the crane's cable. Care has to be maintained to assure the trunnions do not lift out of the up-ender yokes 42. Once the diagonal support arms are fully extended, as shown in FIG. 8, the lifting process is stopped and quick release pins are inserted into the holes in the elbow joints 40 of the support arms 30 and 32 to secure the shipping package in the vertical orientation. The top hoist rings 18 can then be removed from the overhead crane. The procedure is implemented in the reverse steps for lowering the shipping package 10 to the horizontal position.

While specific embodiments of the invention have been described in detail it should be appreciated by those skilled in the art that various modifications and alternatives to those details could be developed in light of the overall teachings of the disclosure. For example, any number of up-ending devices can be connected together as shown in FIG. 2 with adjacent bases sharing a common side beam 44. Furthermore, either one or both of the support arms 30 and 32 can include a spring dampener and either one or both of the support arms can have a locking feature, etc. Accordingly, the particular embodiments disclosed are meant to be illustrative only and not limiting as to the scope of the invention, with is to be given the full breath of the appended claims and any or all equivalence thereof.

What is claimed is:

1. An elongated nuclear component shipping package up-ending device for supporting the shipping package as it is translated between a horizontal and vertical orientation, comprising:
   a base member having a top surface, a first end, a second end, a first side and a second side;
   a first yoke affixed to the base member proximate the intersection of the first end and first side of the base member and formed to pivotally connect to an underside of a first end on a first side of the shipping package;
   a second yoke affixed to the base member proximate the intersection of the first end and the second side of the base member and formed to pivotally connect to an underside of the first end on a second side of the shipping package;
   a first support arm pivotally connected to the base member proximate the intersection of the second end and first side of the base member and formed to pivotally connect to a first side of the shipping package at a location spaced a first distance from the first end of the shipping package, the first support arm having at least two ligaments connected through a pivoting first joint;
   a second support arm pivotally connected to the base member proximate the intersection of the second end and second side of the base member and formed to pivotally connect to a second side of the shipping package at a location spaced the first distance from the first end of the shipping package, the second support arm having at least two ligaments connected through a pivoting second joint; and
   means for securing the up-ending device in position as the shipping package is translated between the horizontal and vertical orientation.

2. The up-ending device of claim 1 wherein the first support arm is connected to the base member and through the first joint so that the first arm pivots through a first plane and the second support arm is connected to the base member and through the second joint so that the second support arm pivots through a second plane.

3. The up-ending device of claim 1 wherein at least one of the first support arm and the second support arm includes a lock that when activated locks the ligaments in position when the ligaments are fully extended to a coaxial extent.

4. The up-ending device of claim 3 wherein the lock on the first support arm comprises an eyelet on either side of the first joint with an aperture in each eyelet aligned coaxially with the aperture in the other eyelet when the ligaments on the first support arm are fully extended so that a locking pin can be inserted through the eyelets and lock the ligaments of the first support arm in position when the first support arm is fully extended.

5. The up-ending device of claim 1 wherein the ligaments of the first support arm are spring biased in a fully extended position.

6. The up-ending device of claim 5 wherein at least one of the ligaments of the first support arm is a hollow tube including a spring anchored at one end within and extending through the hollow tube and connected at another end of the spring to the other ligament across the first joint.

7. The up-ending device of claim 1 including a track parallel to the first side and second side of the base member wherein the base member can translate along the track in a direction perpendicular to the first end and the second end of the base member.

8. The up-ending device of claim 7 including means for translating the base member along the track.

9. The up-ending device of claim 8 wherein the means for translating the base member along the track is a worm screw drive.

10. The up-ending device of claim 1 including a trunnion for securing a leg on the shipping package to the first yoke.

11. The up-ending device of claim 1 including a lock pin for connecting the first side of the shipping package at the location spaced the first distance from the first end of the shipping package.

12. The up-ending device of claim 1 wherein the means for securing the up-ending device in position comprises bolts that bolt the up-ending device to a floor structure.

* * * * *